United States Patent
Ahn et al.

(10) Patent No.: US 8,938,687 B2
(45) Date of Patent: Jan. 20, 2015

(54) DIGITAL TELEVISION AND METHOD OF PROVIDING GRAPHICAL USER INTERFACE USING THE SAME

(75) Inventors: Eun Seon Ahn, Seoul (KR); Jung Hoon Son, Seoul (KR); Byung Hun Lee, Seoul (KR); Su Re Bak, Seoul (KR); Kun Sik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 12/631,890

(22) Filed: Dec. 7, 2009

(65) Prior Publication Data

US 2010/0169807 A1   Jul. 1, 2010

(30) Foreign Application Priority Data

Dec. 29, 2008  (KR) .................. 10-2008-0135175

(51) Int. Cl.
| | |
|---|---|
| *G06F 3/048* | (2013.01) |
| *H04N 5/445* | (2011.01) |
| *H04N 21/422* | (2011.01) |
| *H04N 21/431* | (2011.01) |
| *H04N 21/478* | (2011.01) |
| *H04N 21/482* | (2011.01) |
| *H04N 21/485* | (2011.01) |
| *H04N 21/488* | (2011.01) |

(52) U.S. Cl.
CPC ....... *H04N 5/44513* (2013.01); *H04N 5/44543* (2013.01); *H04N 5/44591* (2013.01); *H04N 21/42222* (2013.01); *H04N 21/4312* (2013.01); *H04N 21/4316* (2013.01); *H04N 21/478* (2013.01); *H04N 21/482* (2013.01); *H04N 21/485* (2013.01); *H04N 21/488* (2013.01)

USPC .......................................... 715/782

(58) Field of Classification Search
USPC ............... 715/782, 781, 810, 764, 835, 836
See application file for complete search history.

(56) References Cited

U.S. PATENT DOCUMENTS

| | | | |
|---|---|---|---|
| 6,121,969 A * | 9/2000 | Jain et al. ...................... 715/850 |
| 7,543,245 B2 | 6/2009 | Irimajiri | |
| 7,685,619 B1 * | 3/2010 | Herz ............................... 725/52 |
| 7,966,575 B1 * | 6/2011 | Jetha et al. .................... 715/817 |
| 8,010,900 B2 * | 8/2011 | Hart et al. ..................... 715/747 |
| 2003/0112279 A1 | 6/2003 | Irimajiri | |
| 2007/0070066 A1 * | 3/2007 | Bakhash ....................... 345/419 |
| 2008/0059893 A1 * | 3/2008 | Byrne et al. .................. 715/757 |
| 2008/0122870 A1 * | 5/2008 | Brodersen et al. ............ 345/634 |

(Continued)

FOREIGN PATENT DOCUMENTS

| | | |
|---|---|---|
| JP | 2002175139 A | 6/2002 |
| KR | 2001083928 A | 9/2001 |
| KR | 2007034340 A | 3/2007 |

OTHER PUBLICATIONS

International Search Report & Written Opinion issued in Application No. PCT/KR2009/007244, mailed Jul. 14, 2010, 8 pages.

*Primary Examiner* — Rashawn Tillery
(74) *Attorney, Agent, or Firm* — Fish & Richardson P.C.

(57) ABSTRACT

A digital television (DTV) and a method of providing a GUI using the DTV are disclosed. The method of providing a GUI in a DTV comprises: first displaying an image on a display unit provided on the DTV; receiving a display command of a first GUI; and second displaying the image and the first GUI such that a different spatial depth is formed between the image and the first GUI according to the received display command.

11 Claims, 12 Drawing Sheets

(56) References Cited

U.S. PATENT DOCUMENTS

2008/0307351 A1* 12/2008 Louch et al. .................. 715/782
2009/0019401 A1* 1/2009 Park et al. .................... 715/841
2009/0204929 A1* 8/2009 Baurmann et al. ............ 715/836

* cited by examiner

DIGITAL TELEVISION AND METHOD OF PROVIDING GRAPHICAL USER INTERFACE USING THE SAME

This nonprovisional application claims priority under 35 U.S.C. §119(a) on Patent Application No. 10-2008-0135175 filed in Republic of Korea on Dec. 29, 2008, the entire contents of which are hereby incorporated by reference.

BACKGROUND

1. Field

This document relates to a digital television (DTV) and, more particularly, to a DTV capable of providing a space sense (i.e., illusion of space or spatial effect allowing for a space recognition) to an object (or contents) and displaying the object with such space sense, and a method of providing a graphical user interface (GUI) using the same.

2. Related Art

Recently, a DTV that implements high picture quality of video data and high sound quality of audio data has come into wide use and been commercialized. In addition, spreading of an Internet protocol television (IPTV), a sort of DTV, is near at hand.

Meanwhile, lately, electronic devices, moving away from seeking simple improvement of performance and design, tend to aim at meeting the demands of individuals with different personalities. Accordingly, manufacturing and selling systems are being constructed in consideration of the difference in user preferences such as customized products or diversification in user options. In addition, user-centered interfaces are being developed for devices allowing a user environment to be adjusted according to user preferences.

The recent remarkable advancement of terminal technology and communication technology enables providing of various contents via DTVs. In line with this, it is urgent to provide interfaces allowing such contents provided via DTVs to be displayed in various manners.

SUMMARY

An aspect of this document is to provide a digital television (DTV) capable of providing a space sense to an object (or contents) in displaying the object, and a GUI providing method using the same.

Another aspect of this document is to provide a DTV capable of displaying a broadcast image and a GUI such that they each have a different spatial depth, and a GUI providing method using the same.

In an aspect, a method of providing a GUI in a DTV comprises: first displaying an image on a display unit provided on the DTV; receiving a display command of a first GUI; and second displaying the image and the first GUI such that a different spatial depth is formed between the image and the first GUI according to the received display command.

In another aspect, a DTV comprises: a display unit configured to display an image; a memory configured to store one or more GUIs; and a controller configured to display the image and a first GUI among the one or more GUIs on the display unit such that a different spatial depth is formed between the image and the first GUI.

According to a DTV and a method of providing a GUI using the same according to exemplary embodiments of the present invention, a new GUI completely different from that of the related art can be provided to users, having the effect of allowing users to feel a space sense from a screen of the DTV and arousing users' fresh sensitivity.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

The foregoing and other objects, features, aspects and advantages of the present invention will become more apparent from the following detailed description of the present invention when taken in conjunction with the accompanying drawings. Exemplary embodiments of the present invention will now be described with reference to the accompanying drawings. Like numbers refer to like elements throughout. In describing the present invention, if a detailed explanation for a related known function or construction is considered to unnecessarily divert the gist of the present invention, such explanation has been omitted but would be understood by those skilled in the art.

A digital television (DTV) according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Figure 1:
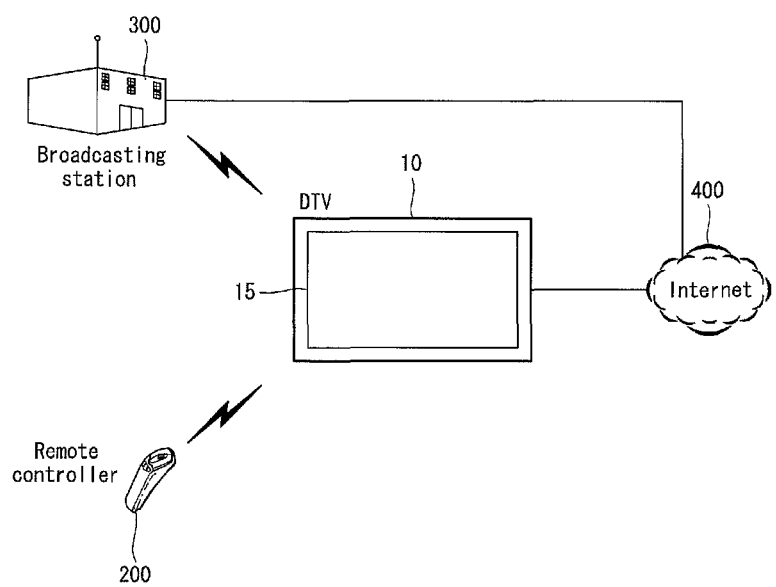
FIG. 1 a schematic view of a system according to an exemplary embodiment of the present invention.

FIG. 1 a schematic view of a system according to an exemplary embodiment of the present invention. The system according to an exemplary embodiment of the present invention may include a digital television (DTV) 10, remote controller 200, a broadcasting station 300, and the Internet 400.

The remote controller 200 may be a three-dimensional (3D) pointing device. The 3D pointing device may detect a 3D motion and transmit information regarding the detected 3D motion to the DTV 10. The 3D motion may correspond to a command (i.e., instruction) for controlling the DTV 10. A user may transfer a certain command to the DTV 10 by moving the 3D pointing device. The 3D pointing device may include various key buttons. The user may input various commands through the key buttons.

The DTV 10 may receive a broadcast signal from the broadcasting station 300 and output the received broadcast signal. The DTV 10 may have a device that can be connected to the Internet 400 by a transmission control protocol/Internet protocol (TCP/IP).

Figure 2:
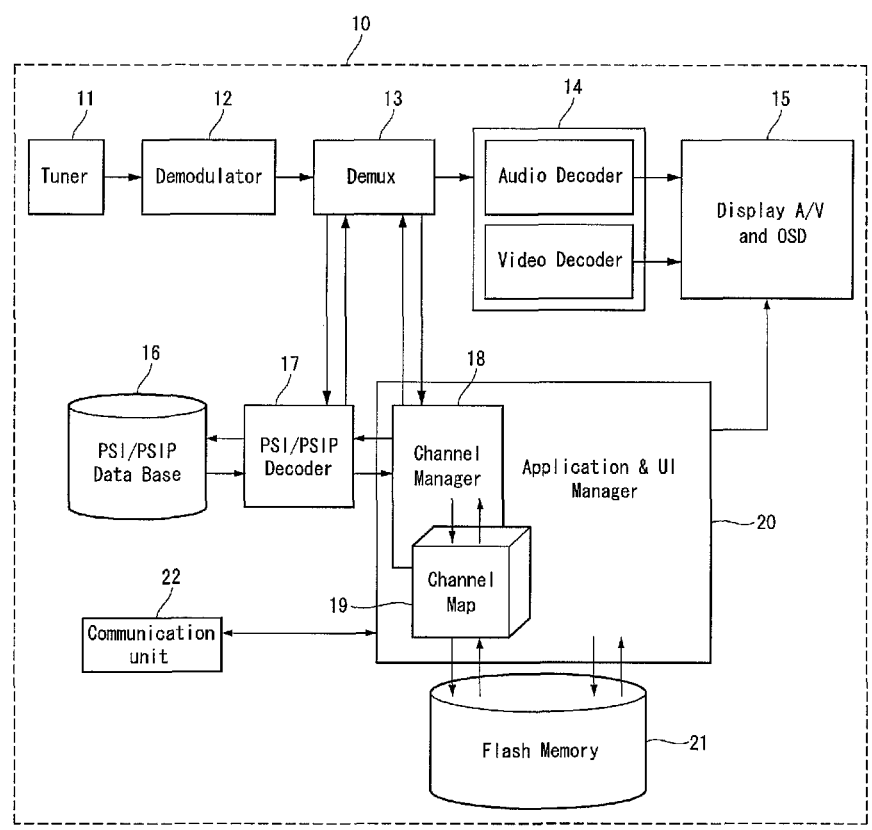
FIG. 2 is a schematic block diagram of a digital television (DTV) according to an exemplary embodiment of the present invention.

FIG. 2 is a schematic block diagram of the (DTV according to an exemplary embodiment of the present invention. The DTV according to an exemplary embodiment of the present invention will now be described in detail with reference to FIG. 2.

The DTV 10 according to an exemplary embodiment of the present invention includes a tuner unit 11, demodulator 12, a demultiplexer 13, an audio/video decoder 14, a display unit 15, a PSI/PSIP (Program and System Information/Program and System Information Protocol) database 16, a PSI/PSIP decoder 17, a channel manager 18, a channel map 19, a controller 20, a flash memory 21, and a communication unit 22.

The tuner unit 11 may receive a digital broadcast signal including a PSI/PSIP table. The operation of the tuner unit 11 may be controlled by the channel manager 18. Thus, the tuner unit 11 records the result of the received digital broadcast signal in the channel manager 18. The tuner unit 11 may include a plurality of tuners for a multi-channel reception.

The demodulator 12 serves to receive a signal which has been tuned by the tuner unit 11 and demodulate the received signal into a VSB/EVSB (Vestigial Side Band/Enhanced Vestigial Side Band) signal.

The demultiplexer 13 demultiplexes transmission packets received after being demodulated by the demodulator 12 into audio, video and PSI/PSIP table data.

In this case, the demultiplexing of the PSI/PSIP table data may be controlled by the PSI/PSIP decoder 17, and the demultiplexing of audio and video may be controlled by the channel manager 18.

If the PSI/PSIP decoder 17 sets a packet identifier (PID) of a desired table as a condition, the demultiplexer 13 creates sections of a PSI/PSIP table satisfying the PID from the transmission packets and transmits the same to the PSI/PSIP decoder 17. Also, if an A/V PID of a corresponding virtual channel is set as a condition by the channel manager 18, the demultiplexer 13 demultiplexes an A/V basic stream and transmits the same to the A/V decoder 14. The A/V decoder 14 decodes the received broadcast data according to a pertinent coding scheme.

The PSI/PSIP decoder 17 parses the PSI/PSIP table sections, reads all of a remaining actual section data portion which has failed to be read during a section filtering performed by the demultiplexer 13, and records the same in the PSI/PSIP database 16.

The channel manager 18 may request reception of a channel-related information table with reference to the channel map 19, and receive the corresponding result. Here, the PSI/PSIP decoder 17 transmits an A/V PID list to the channel manager 18 by controlling demultiplexing of the channel-related information table.

The channel manager 18 can control the A/V decoder 14 by directly controlling the demultiplexer 18 by using the received A/V PID.

The controller 20 may control a graphical user interface (GUI) that displays a state of a receiver system as on screen display (OSD). In addition, the controller 20 controls the elements and controls the general operation of the DTV 10.

The display unit 15 implements broadcast data outputted from the A/V decoder 14, as voice and image. The display unit 15 may include a plurality of displays which are separately installed physically and logically. The display unit 15 may include one or more physical displays.

The first and second displays 31 and 32 may have the same size and/or same resolution, or may have a different size and/or different resolution from each other.

At least one of the first and second displays 31 and 32 may receive and output broadcast data, and may have a display function of the general DTV.

At least one of the first and second displays 31 and 32 may display data broadcast, text broadcast, captions, advertisement, and the like which have been separated from the broadcast data or which have been separately received. In addition, at least one of the first and second displays 31 and 32 may display supplementary information such as stock information, weather information, an instant message window, and the like. In addition, at least one of the first and second displays 31 and 32 does not have an audio function. In addition, the first and second displays 31 and 32 may be independently provided with power so as to be independently driven by a control signal outputted from the controller 20.

The communication unit 22 may communicate with the remote controller 200. For example, the communication unit 22 and the remote controller 200 may communicate according to an RF communication method or an infrared communication method. A communication method between the remote controller 200 and the DTV 10 is not limited.

Figure 3A:
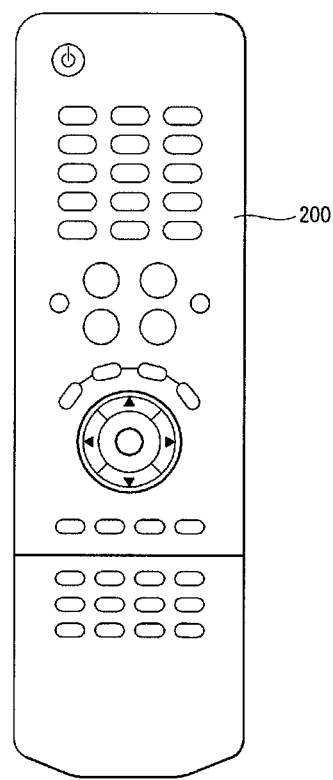
FIG. 3*a* illustrates an external appearance of a remote controller 200 according to an exemplary embodiment of the present invention.
Figure 3B:
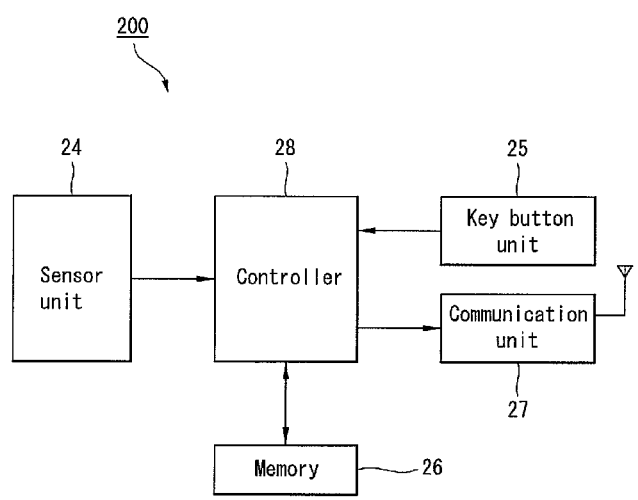
FIG. 3*b* is a schematic block diagram of the remote controller 200 according to an exemplary embodiment of the present invention.

FIG. 3a illustrates an external appearance of a remote controller 200 according to an exemplary embodiment of the present invention, and FIG. 3b is a schematic block diagram of the remote controller 200 according to an exemplary embodiment of the present invention. The remote controller 200 according to an exemplary embodiment of the present invention will now be described with reference to FIGS. 3a and 3b. The remote controller 200 according to an exemplary embodiment of the present invention as shown in FIGS. 3a and 3b may be the above-mentioned 3D pointing device or other devices.

The remote controller 200 according to an exemplary embodiment of the present invention may comprise a sensor unit 24, a key button 25, a memory 26, a communication unit 27, and a controller 28.

The sensor unit 24 may sense a 3D motion of the remote controller 200. The sensor unit 24 may include one or more of a gyro sensor, a gravity sensor, an initial sensor, a geomagnetic sensor, and an acceleration sensor, and may sense the 3D motion by using one of these sensor or any of their combinations.

The key button unit 25, which receives various information or commands from the user, may include one or more key buttons. For example, as shown in FIG. 3a, the key button unit 25 may be provided on the entire surface of the remote controller 200.

The memory 26 stores a certain program for controlling a general operation of the remote controller 200, and may temporally or permanently store data inputted or outputted and various processed data when the general operation of the remote controller 200 is performed by the controller 28.

The communication unit 27 transmits information regarding a motion sensed by the sensor unit 24 or a signal inputted through the key button unit 25 to the DTV 10.

The controller 28 controls the elements, and controls the general operation of the remote controller 200 according to an exemplary embodiment of the present invention.

Figure 4:
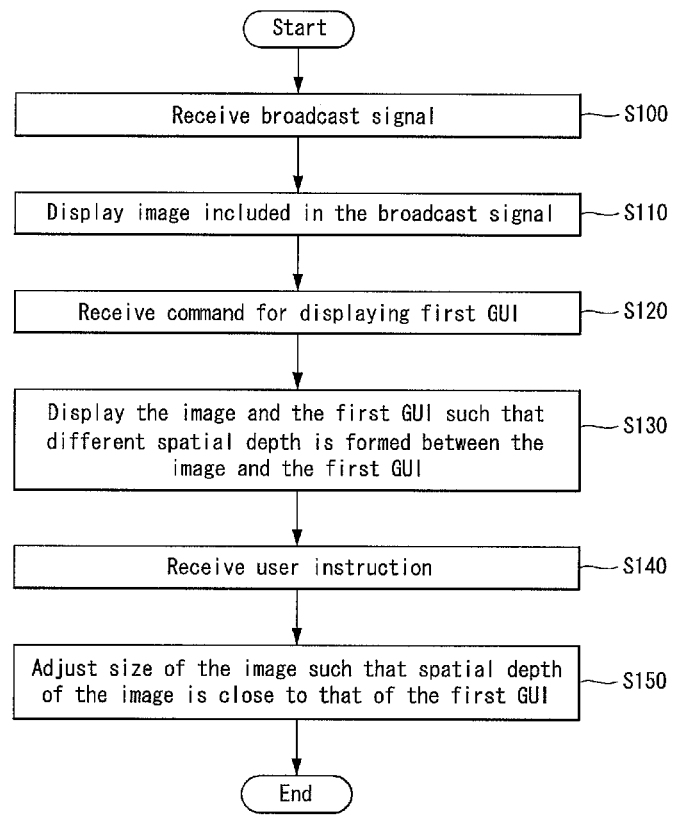
FIG. 4 is a flow chart illustrating the process of a method of providing a GUI in a DTV according to an exemplary embodiment of the present invention.

FIG. 4 is a flow chart illustrating the process of a method of providing a GUI in a DTV according to an exemplary embodiment of the present invention. The method of providing a GUI in a DTV according to an exemplary embodiment may be implemented by the DTV 10 as described above with reference to FIGS. 1 to 3. The method of providing a GUI in a DTV according to an exemplary embodiment of the present invention and the operation of the DTV 10 for implementing the same will now be described in detail.

The controller 20 may receive a broadcast signal (S100) and display an image 30 included in the received broadcast signal on the display unit 15 (S110).

Figure 5A:
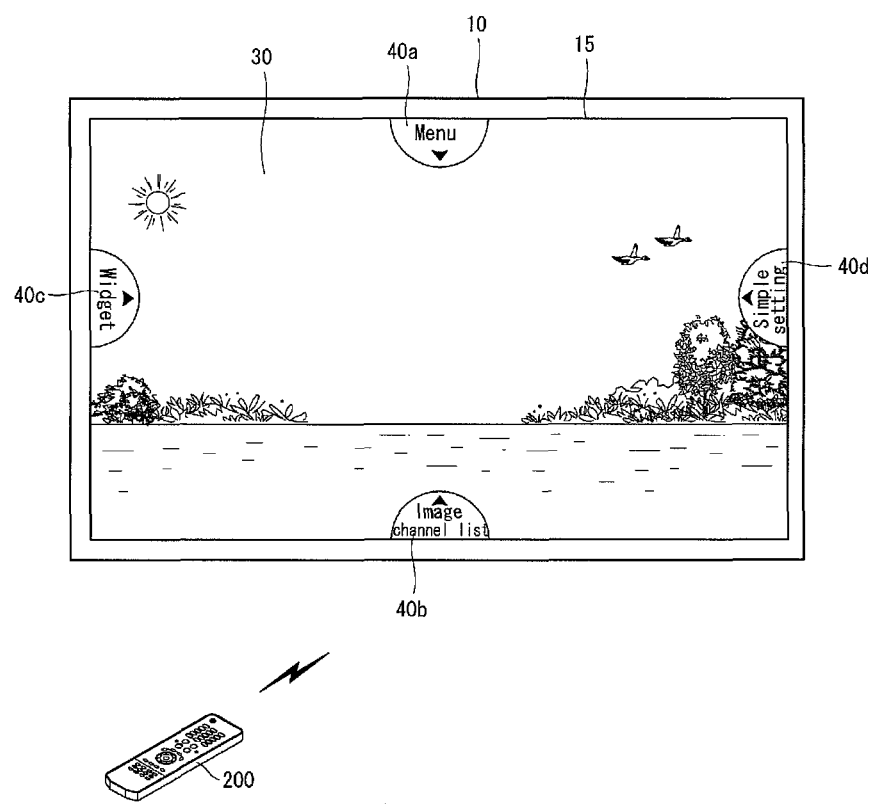
FIG. 5*a* illustrates an example of a screen image 30 included in a broadcast signal.

FIG. 5a illustrates an example of a screen image 30 included in a broadcast signal. With reference to FIG. 5a, the controller 20 may display the broadcast image 30 on the display unit 15 and display at least one icon that may function as a user interface on the display unit 15. The screen image of FIG. 5a includes four icons 40a, 40b, 40c, and 40d. The four icons 40a, 40b, 40c, and 40d may be all displayed on the display unit 15 simultaneously, or may be displayed one by one according to a user instruction. FIG. 5a shows the four icons 40a, 40b, 40c, and 40d for the sake of brevity. At least one graphical user interface (GUI) may correspond to each of the four icons 40a, 40b, 40c, and 40d, and at least one application may correspond to each of the four icons 40a, 40b, 40c, and 40d. At least one of the GUI and the application may be stored in the memory 21 or may be downloaded to the DTV 10 via the broadcasting station 300 or the Internet 400.

The fourth icons each may be displayed at a predetermined position and may overlap with the broadcast image 30 transparently or translucently.

The controller 20 may receive a command of displaying a first GUI (S120) and display the image and the first GUI on the display unit 15 such that they have mutually different spatial depths therebetween (S130).

The first GUI may be 2D (dimensional) or 3D image. In other words, the first GUI includes the graphical element which is 2D or 3D.

The controller 20 can execute 2D image processing and/or 3D image processing. The controller 20 can process the first GUI such that the different spatial depth is formed between the image and the first GUI, depending on whether the first GUI is 2D or 3D.

The command of displaying the first GUI may be received from the user. For example, the user may manipulate the remote controller 200 to command displaying of the first GUI on the display unit 15. In addition, the command of displaying the first GUI may be transmitted or received within the DTV 10. For example, if a pre-set event occurs in the DTV 10, the controller 20 may recognize the occurring event as the first GUI display command. For example, the occurrence of an event such as an arrival of a particular time such as a start time of alarm or a particular broadcast program or reception of particular information via the Internet 400 may be recognized as the first GUI display command.

The first GUI is a user interface that can be displayed on the display unit 15, and its type is not limited in this document. Reference numerals 50a, 50b, 50c, and 50d (to be described) are examples of the first GUI. For example, the first GUI may comprise a menu including at least one item. Also, the first GUI may comprise a list of particular data such as a list of preferred channels or preferred programs. In addition, the first GUI may comprise a list of various multimedia contents stored in the DTV 10.

Figure 5B:
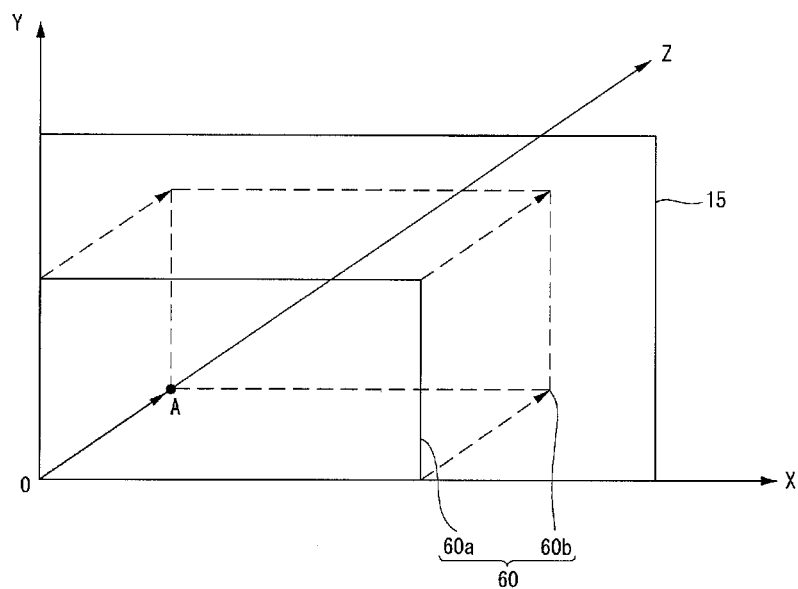
FIG. 5*b* is a graph for explaining a spatial depth of this document.

The controller 20 may control the display unit 15 and objects displayed on the display unit 15 such that the objects exist at mutually different positions in a 3D space. FIG. 5b is a graph for explaining a spatial depth of this document. With reference to xyz coordinate axes illustrated in FIG. 5b, a spatial depth in this document refers to the distance on the z axis. For example, when a first object 60 expressed in two dimensions moves from a position 60a to a position 60b, a spatial depth of the first object 60 changes. Namely, in this document, the spatial depth is a concept controlled over the object displayed on the display unit 15 such that the display unit 15 can be recognized as a three-dimensional space.

The controller 20 may reduce the size of the image 30 such that a first spatial depth corresponding to the image 30 is deeper than that of a second spatial depth corresponding to the first GUI.

Figure 6:
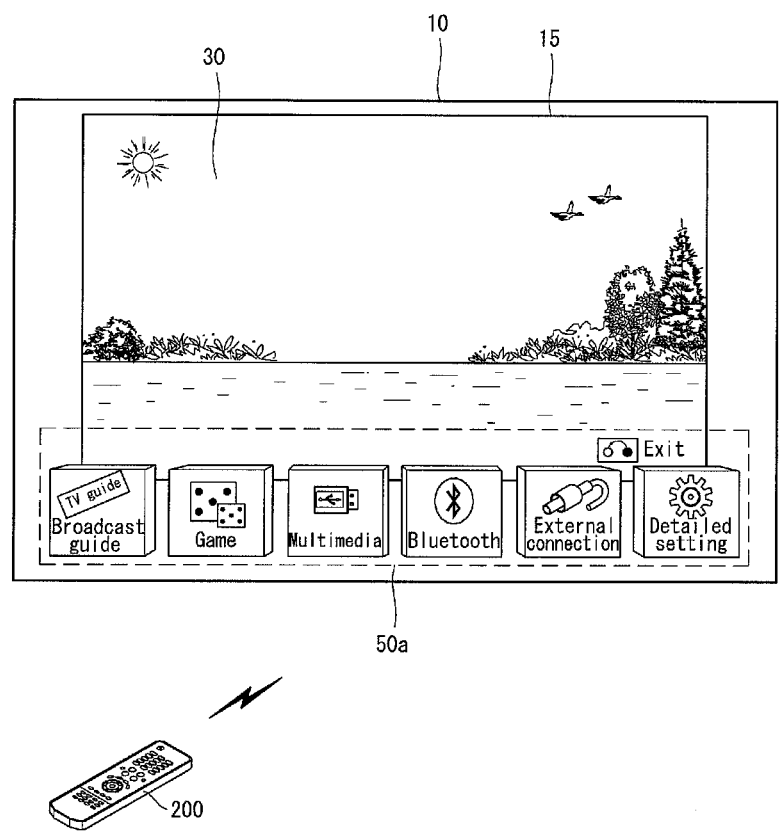
FIGS. 6 and 7 illustrate examples of performing step S130.
Figure 7:
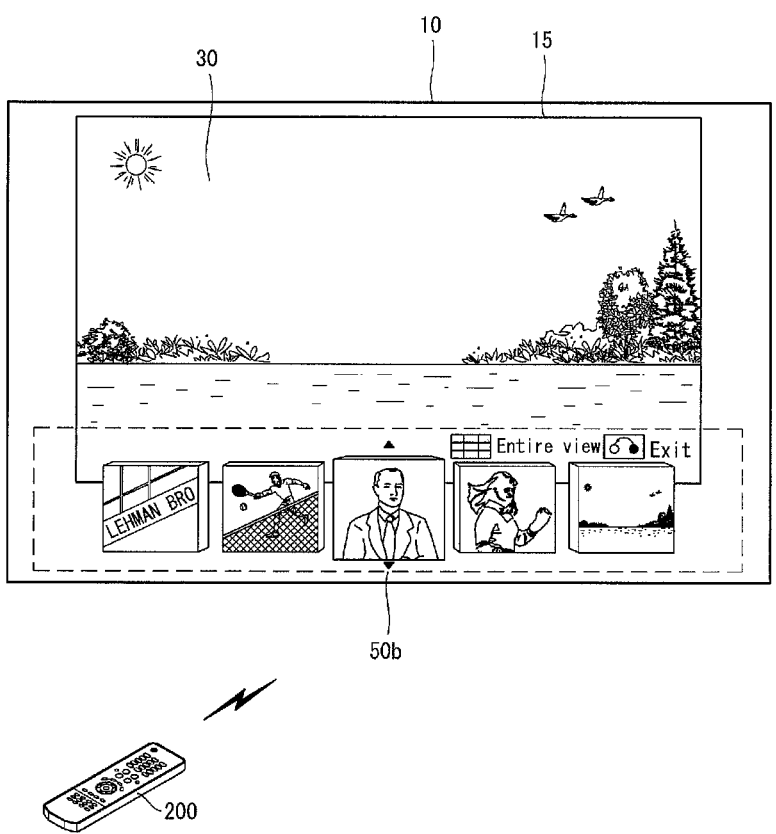

FIGS. 6 and 7 illustrate examples of performing step S130. FIG. 6 shows the case where the first icon 40a in FIG. 5a is selected, and FIG. 7 shows the case where the second icon 40b in FIG. 5a is selected. The methods in which particular icons are selected from among the plurality of icons 40a, 40b, 40c, and 40d on the screen image of FIG. 5a may vary. For example, the user may select a particular icon from among the plurality of icons 40a, 40b, 40c, and 40d by pressing a particular key allocated to each of the plurality of icons 40a, 40b, 40c, and 40d, among the plurality of keys included in the key button unit 25 of the remote controller 200. Also, for example, if the remote controller 200 is a 3D pointing device that can recognize a motion, the user may move the remote controller 200 in the space to position a cursor (not shown) displayed on the display unit 15 on a particular icon desired to be selected from among the plurality of icons 40a, 40b, 40c, and 40d, and press a select button to thus select the particular icon.

For example, with reference to FIG. 6, when the first icon 40a is selected, the controller 20 may display the (1-1)th GUI 50a corresponding to the first icon 40a on the display unit 15. Here, the controller 20 may reduce the size of the broadcast image 30 such that a different spatial depth is formed between the broadcast image 30 and the (1-1)th GUI 50a.

In addition, with reference to FIG. 7, when the second icon 40b is selected, the controller 20 may display the (1-2)th GUI 50b corresponding to the second icon 40b on the display unit 15. Here, the controller 20 may reduce the size of the broadcast image 30 such that a different spatial depth is formed between the broadcast image 30 and the (1-2)th GUI 50b.

As shown in FIGS. 6 and 7, the controller 20 may divide the entire region of the display unit 15 into a plurality of sections each having a different spatial depth, and display the broadcast image 30 at a first section with the deepest spatial depth and display the first GUI 50 at a predetermined second section among the plurality of sections.

As shown in FIGS. 6 and 7, the first GUI 50a and 50b may be displayed three-dimensionally. Because the first GUI is displayed three-dimensionally, the user may feel a space sense more intensely.

The controller 20 may visually provide a process during which the image 30 is reduced in size. Namely, the controller 20 may provide control to change the image 30 such that it is gradually changed from the initial size to the final size during a certain time period. Visually recognizing the process during which the image 30 is reduced in size, the user may have a feeling that the image 30 is being retreated on the display unit 15. Namely, because the spatial depth of the image 30 becomes deep, the user may recognize the display unit 15 as a three-dimensional space.

Figure 8:
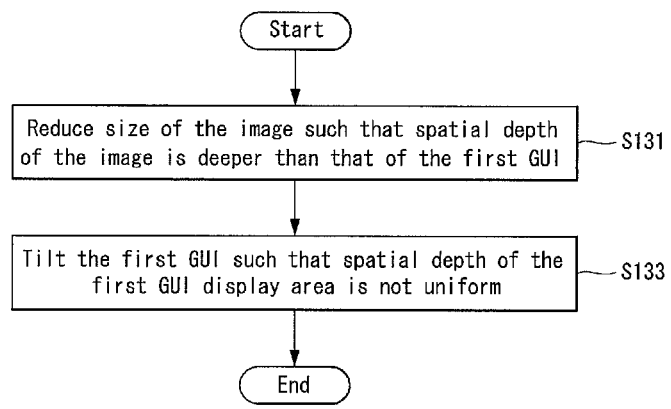
FIG. 8 is another example of a detailed flow chart illustrating step S130.

FIG. 8 is another example of a detailed flow chart illustrating step S130. The controller 20 may reduce the size of the image 30 such that the first spatial depth of the image 30 is deeper than that of the first GUI 50 (e.g., 50a, 50b, 50c, 50d)

(S131) and display the first GUI 50 in a tilting manner on its displayed area such that the second spatial depth of the first GUI 50 is not uniform.

Figure 9:
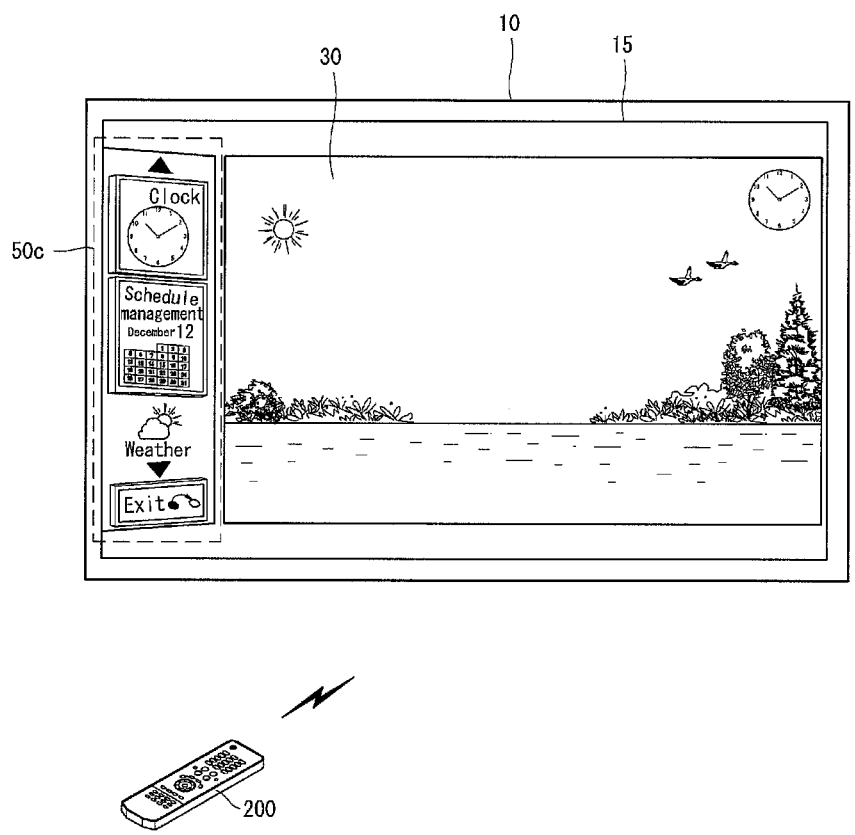
FIGS. 9 and 10 illustrate examples of performing steps S131 and S133.
Figure 10:
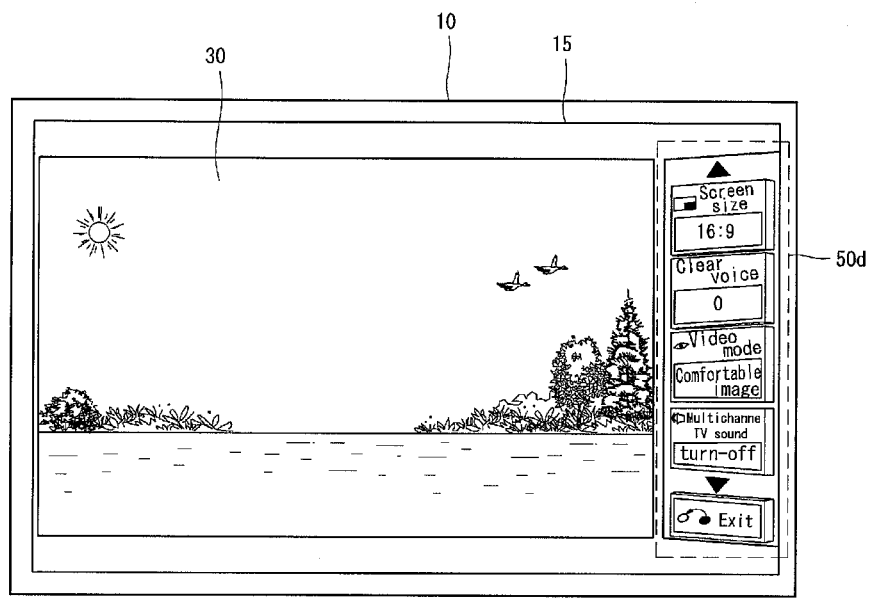
Figure 10:
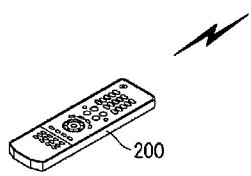

FIGS. 9 and 10 illustrate examples of performing steps S131 and S133. FIG. 9 shows a screen image displayed when the third icon 40c in FIG. 5A is selected, and FIG. 10 shows a screen image displayed when the fourth icon 40d in FIG. 5a is selected.

For example, with reference to FIG. 9, when the third icon 40c is selected, the controller 20 may display the (1-3)th GUI 50c corresponding to the third icon 40c on the display unit 15. Here, the controller 20 may reduce the size of the broadcast image 30 such that a different spatial depth is formed between the broadcast image 30 and the (1-3)th GUI 50c. In addition, the controller 20 may display the (1-3)th GUI 50c in a tilting manner to allow the user to have a space sense through the display form of the (1-3)th GUI 50c. As shown in FIG. 9, the (1-3)th GUI 50c has a non-uniform spatial depth in its displayed area. Namely, the (1-3)th GUI 50c may be displayed such that its left portion may have a thinner spatial depth and its right portion may have a deeper spatial depth.

As shown in FIG. 9, the controller 20 may display the (1-3)th GUI 50c in a tilting manner such that the spatial depth corresponding to one side (e.g., the left side in FIG. 9) of the (1-3)th GUI 50c is equal to the first spatial depth of the image 30 and the spatial depth corresponding to the other side (e.g., the right side in FIG. 9) of the (1-3)th GUI 50c is not equal to the first spatial depth of the image 30.

Also, for example, with reference to FIG. 10, when the fourth icon 40d is selected, the controller 20 may display the (1-4)th GUI 50d corresponding to the fourth icon 40d on the display unit 15. Here, the controller 20 may reduce the size of the broadcast image 30 such that a different spatial depth is formed between the broadcast image 30 and the (1-4)th GUI 50d. Also, the controller 20 may display the (1-4)th GUI 50d in a tilting manner, so that the user can recognize a space sense through the display form of the (1-4)th GUI 50d.

The controller 20 receives a user instruction (S140), and may provide control to adjust the size of the image 30 such that the first spatial depth of the image 30 is close to the second spatial depth of the first GUI 50 (S150). Here, Proximity of the first spatial depth of the image 30 to the second spatial depth of the first GUI 50 means that if the first spatial depth is deeper than the second spatial depth, the image 30 becomes close to zero (0) on the z axis in FIG. 5b and if the first spatial depth is shallower than the second spatial depth, the image 30 becomes away from the zero (0) on the z axis.

In the above-mentioned exemplary embodiments, the spatial depth of the broadcast image 30 is deeper than that of the first GUI 50, but exemplary embodiments proposed in this document are not limited thereto. Namely, the spatial depth of the broadcast image 30 may be adjusted to be shallower than that of the first GUI 50.

In addition, the first spatial depth corresponding to the broadcast image 30 and the second spatial depth corresponding to the first GUI 50 may be set or changed by the user.

The method of providing a GUI in a DTV according to exemplary embodiments of the present invention as described above may be recorded in a computer in a computer-readable recording medium as a program to be executed in a computer, so as to be provided.

The method of providing a GUI in a DTV may be executed by software. When the method of providing a GUI in a DTV is executed by software, the elements according to the exemplary embodiments of the present invention are code segments that execute required operations. Programs or the code segments may be stored in a process-readable medium or may be transmitted by a computer data signal combined with a carrier in a communication network.

The computer-readable recording medium comprises any types of recording devices in which data that can be read by a computer system is stored. For example, the computer-readable recording device may comprise a ROM, a RAM, a CD-ROM, a DVD±ROM, a DVD-RAM, a magnetic tape, a floppy disk, a hard disk, an optical data storage device, and the like. Also, the computer-readable recording medium may be distributed to computer devices connected by a network, and codes that can be read by computers may be stored and executed therein in a distributed manner.

What is claimed is:

1. A method of providing a graphical user interface (GUI) in a digital television (DTV), the method comprising:
    displaying, on a display unit, an image included in a broadcasting signal;
    receiving a display command;
    based on the received display command:
        dividing a display depth of the display unit into a plurality of spatial depths;
        changing a size of the image included in the broadcasting signal such that the image included in the broadcasting signal is displayed at a first spatial depth among the plurality of spatial depths, and
        displaying a first GUI at a second spatial depth among the plurality of spatial depths, the second spatial depth being different from the first spatial depth, wherein,
        the first GUI is displayed in a tilting manner such that a spatial depth corresponding to one side of the first GUI is equal to the first spatial depth and a spatial depth corresponding to the other side of the first GUI is not equal to the first spatial depth.

2. The method of claim 1, wherein changing the size of the image included in the broadcasting signal such that the image included in the broadcasting signal is displayed at a first spatial depth among the plurality of spatial depths comprises:
    reducing the size of the image included in the broadcasting signal such that the first spatial depth corresponding to the image included in the broadcasting signal is deeper than the second spatial depth corresponding to the first GUI.

3. The method of claim 2, wherein reducing the size of the image included in the broadcasting signal comprises:
    visually providing the process in which the size of the image included in the broadcasting signal is reduced.

4. The method of claim 1, wherein the first GUI comprises a menu comprising at least one item.

5. The method of claim 1, wherein the first GUI is 3D (dimensional) image.

6. A digital television (DTV) comprising:
    a display unit configured to display an image included in a broadcasting signal;
    a memory configured to store one or more GUIs; and
    a controller configured to:
        receive a display command;
        based on the received display command:
            divide a display depth of the display unit into a plurality of spatial depths;
            change a size of the image included in the broadcasting signal such that the image included in the broadcasting signal is displayed at a first spatial depth among the plurality of spatial depths, and
            display a first GUI at a second spatial depth among the plurality of spatial depths, the second spatial depth being different from than the first spatial depth, wherein, the first GUI is displayed in a tilting manner such that a spatial depth corresponding to one side of the first GUI is equal to the first spatial depth and a spatial depth corresponding to the other side of the first GUI is not equal to the first spatial depth.

7. The digital television of claim 6, further comprising:
a broadcast receiving unit configured to receive a broadcast signal, wherein the image is received via the broadcast receiving unit.

8. The digital television of claim 6, wherein the controller changes the size of the image included in the broadcasting signal such that the image included in the broadcasting signal is displayed at the first spatial depth among the plurality of spatial depths by reducing the size of the image included in the broadcasting signal such that the first spatial depth corresponding to the image included in the broadcasting signal is deeper than the second spatial depth corresponding to the first GUI.

9. The digital television of claim 8, wherein the controller visually provides the process in which the size of the image included in the broadcasting signal is reduced.

10. The digital television of claim 6, wherein the first GUI comprises a menu comprising at least one item.

11. The digital television of claim 6, wherein the first GUI is 3D (dimensional) image.

* * * * *